United States Patent [19]

Hamel et al.

[11] Patent Number: 5,748,815
[45] Date of Patent: May 5, 1998

[54] OPTICAL COMPONENT ADAPTED TO MONITOR A MULTIWAVELENGTH LINK AND ADD-DROP MULTIPLEXER USING THIS COMPONENT, APPLICATION TO OPTICAL NETWORKS

[75] Inventors: André Hamel, Lannion; Daniel Laville, Perros Guirec, both of France

[73] Assignee: France Telecom, Paris, France

[21] Appl. No.: 703,945

[22] Filed: Aug. 28, 1996

[30] Foreign Application Priority Data

Sep. 1, 1995 [FR] France ................................ 95 10302

[51] Int. Cl.$^6$ ................................................ G02B 6/34
[52] U.S. Cl. ........................... 385/37; 385/10; 385/24; 385/31; 359/130; 359/118; 359/119
[58] Field of Search ............................. 385/37, 16, 10, 385/24, 31, 39; 359/114, 130, 124, 115, 118, 119

[56] References Cited

U.S. PATENT DOCUMENTS 4,749,247 6/1988 Large.

FOREIGN PATENT DOCUMENTS 651528 5/1995 European Pat. Off..

OTHER PUBLICATIONS

M.I. Irshid and M. Kavehard, A Fully Transparent Fiber-Optic Ring Architecture For WDM Networks, Journal of Lightwave Technology, vol. 10, No. 1, pp. 101–108, Jan. 1992.
A.F. Elrefaie and S. Zaidi, Fibre Amplifiers In Closed-Ring WDM Networks, Electronics Letters, vol. 28, No. 25, pp. 2340–2341, Dec. 3, 1992.

A. Hamel et al., Multilayer Add–Drop Multiplexers In A Self-Healing WDM Ring Network, OFC'95 Techniocal Digest, pp. 84–85.

J.P. Laude, Le Multiplexage En Longueur D'Onde, Masson, Chap. 7, pp. 39–50.

Patent Abstracts Of Japan, vol. 9, No. 26, (p–332) [1749], 5 Feb. 1985 & JP-A-59 170815 (Hitachi).

Patent Abstracts Of Japan, vol. 11, No. 390 (E–567), 19 Dec. 1987, & JP-A-62-154685 (Matsushita).

Proceedings Of The International Conference On Communications (ICC), Geneva, May 23–26, 1993, vol. 1–2–03, May 23, 1993, Institute Of Electrical And Electronics Engineers, pp. 1245–1251, Elrefaie, A.F., "Multiwavelength Survivable Ring Network Architectures".

IEE Proceedings J. Optoelectronics, vol. 136, No. 3, Part J., Jun. 1, 1989, pp. 183–202, Senior J. M. et al., "Devices For Wavelength Multiplexing And Demultiplexing".

*Primary Examiner*—Phan T. H. Palmer
*Attorney, Agent, or Firm*—Pearne, Gordon, McCoy & Granger LLP

[57] ABSTRACT

Optical component adapted to monitor a multiwavelength link for use as an add-drop multiplexer in optical networks. The optical component includes an input fiber (68) for transmitting signals of different wavelengths, a diffraction grating (70) for dispersing these signals on several orders of diffraction, fibers (72, 74, 76 and 78) for recovering the dispersed signals corresponding to a given order of diffraction, and fibers (79, 80, 82, and 84) for recovering the same signals but corresponding to another order of diffraction so as to monitor the state of these signals.

7 Claims, 3 Drawing Sheets

OPTICAL COMPONENT ADAPTED TO MONITOR A MULTIWAVELENGTH LINK AND ADD-DROP MULTIPLEXER USING THIS COMPONENT, APPLICATION TO OPTICAL NETWORKS

BACKGROUND OF THE INVENTION

The present invention relates to an optical component adapted to monitor a multiwavelength link and an add-drop multiplexer using this component.

In particular, it is applicable to the field of optical telecommunications and more particularly to optical ring networks.

Thanks to the introduction of the so-called Synchronous Digital Hierarchy standard, ring transmission architectures are advantageous in that they are economical and have good reliability.

This transmission standard has introduced the frame notion for transmitting information.

In each frame, a space is reserved to transporting indications concerning transmission quality and the alarms inserted in each item of equipment of a network using this standard.

An example of such network is shown diagrammatically in FIG. 1.

Electronic equipment 2, 4, 6 and 8 (electronic add-drop multiplexers) are installed at the various nodes of the network.

The multiplexer 2 installed in the main node of the network is used to exchange information with another network 10.

The other multiplexers 4, 6 and 8 are used to exchange information with users 12, 14 and 16 respectively.

In the network of FIG. 1, the information is transmitted in a single direction by means of optical fibers which ensure the junction between the various nodes of the network and form a loop or ring.

With the structure of the ring network shown in FIG. 1, each transmission section is monitored by a multiplexer.

The information is routed to the main node 2 in which the ring network management means (not shown) are able to know at any moment the transmission quality in each section of this network.

This allows localizing a fault on the network.

FIG. 1 also shows an optical fiber loop 18 connecting the various nodes of the network and a stand-by loop able to transmit the information in a direction opposite that of the loop 18, even in case of a failure on loop 18.

Optical multiplexing techniques have already been applied to a ring network architecture.

In this respect, reference may be made to "Multiwavelength Survivable Ring Network Architectures", A. F. Elrefaie, Bellcore ICC 93, Geneva, May 23–26, 1993, Vol. 1-2-03, May 23, 1993, IEEE, pgs. 1245–1251, and "A Fully Transparent Fiber Optical Ring Architecture for WDM Networks", M. I. Irshid, M. Kavehrad, Journal of Lightwave Technology, Vol. 10, No. 1, January 1992.

FIG. 2 shows diagrammatically a unidirectional ring network with spectral routing.

In the ring network of FIG. 2, the network nodes 22, 24, 26 and 28 are respectively provided with optical multiplexers 30, 32, 34 and 36.

Each multiplexer provides a signal add-drop function at a given wavelength.

In this network of FIG. 2, optical continuity is ensured along an optical fiber unidirectional loop 38 known as a normal loop.

The information is sent in a given direction onto this normal loop and also in an opposite direction onto another optical fiber loop 40 which forms a stand-by loop so as to guarantee transmission, even if a single line is broken.

FIG. 2 also shows transmission means 42 and receiving means 44 equipping the network.

These means 42 and 44 communicate with the network head 46 via which all the information passes and which performs a distribution function.

The ring network of FIG. 2 communicates with another network 48 known as a transmission network by means of the network head 46.

Each network node of FIG. 2 communicates with a user symbolized by a double arrow.

The information intended for a given node is transported by a signal at a given wavelength.

For example, the information intended for node 22 are transported by a signal at a wavelength $\lambda 1$, and are optically directed by the associated optical add-drop multiplexer 30 centered on this wavelength $\lambda 1$.

The optical add-drop multiplexers are therefore key components of ring networks with spectral routing.

In the network of FIG. 2, if the signal of wavelength $\lambda 1$ is completely extracted, that is if the residual signal in the loop after extraction is sufficiently weak, the return information to the network head 46 can use the same wavelength $\lambda 1$.

Thus, it is possible to reuse wavelengths in this ring network of FIG. 2.

In this case, such ring network including N nodes or stations requires N wavelengths.

In a multiwavelength ring network of the type shown diagrammatically in FIG. 2, the information, which is transmitted at the wavelength $\lambda 4$ and intended for the node 28, is not monitored during transmission on the first four sections of this ring of FIG. 2.

Several optical methods are adapted for making an optical add-drop multiplexer.

Commercially available devices allowing to separate wavelengths are components with diffraction gratings or components with multi-dielectric filters.

There are known components made by the company Jobin Yvon which allow separating four to twenty channels.

The insertion losses are within the range of 2.5 dB to 4 dB for a single component.

It is possible to carry out an extraction and then an insertion via a back-to-back mounting of two components as mentioned in A. F. Elfefare, et al., "Fiber Amplifiers in Closed Ring WDM Networks", Electron Lett., Vol. 28, pp 2340 to 2341, 1992, but all the channels undergo the same insertion losses (of about 5 to 6 dB).

Each channel has a passband transfer function which is relatively narrow and the curve of this transfer function of is the sinusoidal type.

Thus, the losses are minimal at the central wavelength and increase when moving away from it.

In the current state of the technique, the width at mid-height of the representative curve of the transfer function is 0.8 nm for a distance of 4 nm between the channels.

This characteristic requires a precise positioning of the wavelength of the sources of a network using such component.

An optical add-drop multiplexer can be implemented by means of two multi-dielectric passband filters, as mentioned in A Hamel, D. Laville et al., "Multilayer Add-Drop Multiplexers in a Self-Healing WDM Ring Network", OFC95, pp 84 and 85.

The transmission characteristic is used for extracting a given wavelength, while the reflection characteristic is used to direct all the wavelengths in transit towards the output.

The use of these filters is advantageous for small rings where a single wavelength or two wavelengths at the most are processed by a node of the network, as the insertion losses are low (1.5 dB at the most).

The use of a diffraction grating to embody an optical add-drop multiplexer is shown in Elrefaie, "Multiwavelength Survivable Ring Network Architectures", previously mentioned.

Thus use is well adapted to a large ring (including about ten nodes) with several wavelengths per node.

The higher insertion losses are independent of the number of channels.

FIG. 3 diagrammatically shows an optical add-drop multiplexer including two components 50 and 52 which are mounted back-to-back and each including one diffraction grating.

The multiplexer of FIG. 3 receives signals of different wavelengths, that is four wavelengths $\lambda 1$, $\lambda 2$, $\lambda 3$ and $\lambda 4$ in the example of FIG. 3.

The component 50 allows extraction of the signal of the wavelength $\lambda 1$ and the component 52 allows insertion of a wavelength signal $\lambda 1$ in the remaining signals of wavelengths $\lambda 2$, $\lambda 3$ and $\lambda 4$, so as to find at the output of the multiplexer a mix of signals of respective wavelengths $\lambda 1$, $\lambda 2$, $\lambda 3$ and $\lambda 4$.

In one alternative embodiment (not shown), an optical switch is inserted between the grating components 50 and 52, which makes it possible to modify the connection of the network multiplexer channels and obtain a re-configurable optical add-drop multiplexer.

The diffraction grating optical add-drop multiplexers are in particular applicable to high-capacity ring networks (several wavelengths).

It is also possible to resort to optical amplification to increase the range of the sections of such ring network and compensate the losses of the optical add-drop multiplexers of the network.

So as to monitor the sections of a multiwavelength ring network, it is known to sample, by means of an optical coupler, a small power percentage before and possibly after an optical add-drop multiplexer at each node of the ring network and analyzing the optical spectrum obtained.

This is diagrammatically illustrated by FIG. 4 showing an optical add-drop multiplexer 54.

The input 56 thereof receives signals of wavelengths $\lambda 1 \ldots \lambda N$ respectively.

This multiplexer allows extracting from these signals a signal with a given wavelength, for example $\lambda 1$, which is obtained at the extraction output 58 of the multiplexer.

The latter also allows inserting in the non-extracted signals a signal with a wavelength $\lambda 1$ via the insertion input 60 of the multiplexer.

There is a set of signals of respective wavelengths $\lambda 1 \ldots \lambda N$ at the output 61 of the multiplexer.

FIG. 4 shows an optical coupler 62 mounted at the input 56 of the multiplexer.

This coupler 62 allows extracting one portion of the incident signals of respective wavelengths $\lambda 1 \ldots \lambda N$.

A demultiplexing device 64 mounted after the coupler 62 allows separating the signals so as to analyze them.

This method results in additional losses as regards the link balance, because of losses due to the optical coupler, and requires an optical component, namely the demultiplexing device 64, so as to separate the channels.

BRIEF SUMMARY OF THE INVENTION

The object of this invention is to overcome the preceding drawbacks.

The invention allows monitoring each section of a multiwavelength ring network in the particular case where the optical add-drop multiplexers use a diffraction grating.

The invention is a diffraction grating component adapted to be used in an optical add-drop multiplexer.

This component is based on the angular dispersion characteristic of a diffraction grating on several orders of diffraction.

This means that a monochromatic optical signal placed at the input of the diffraction grating will be distributed on several outputs.

In practice, so as to have good performances, especially in applications to optical transmission, diffraction gratings designed to concentrate the major portion of the input power on a single order of diffraction are used.

Such diffraction gratings are known as blazed gratings and in practice yields of 85 to 90% are obtained, as mentioned in J. P. Laude, Le Multiplexage en Longueur D'onde", Masson, Ch. 7, pp. 39–50.

The energy complement is distributed over the other orders of diffraction of the grating and, in known types of diffraction grating components, this energy complement is lost in the optical assembly containing the diffraction grating.

On the other hand, this invention uses the light corresponding to an unused order of diffraction so as to obtain the output signals of the component.

The invention preferably uses the light corresponding to a secondary order of diffraction.

This light makes it possible to control the state of the optical channels in a transmission section of a ring network.

The invention does not change the transmission performances of the diffraction grating component.

The invention is applicable to multiwavelength point-to-point links on optical fibers and is particularly advantageous for high-capacity ring networks which are adapted to the use of diffraction gratings.

Since these ring networks carry a high traffic, it is important to be able to monitor the flow transmitted on each section of the network.

More specifically, this invention firstly relates to an optical component comprising:

an input optical fiber for transmitting optical signals of different wavelengths with respect to one another, a diffraction grating for angularly dispersing each of these signals on several orders of diffraction, and a first set of optical fibers for recovering thus dispersed signals having different wavelengths with respect to one another and corresponding to a given order of diffraction, so as to transmit these signals, this component being characterized in that it further comprises a second set of optical fibers for respectively recovering the same signals as those recovered by the fibers of the first set but corresponding to another order of diffraction, so as to control the state of these recovered signals.

The diffraction grating is preferably a flat blazed grating.

According to a preferred embodiment of the component object of the invention, this flat grating is blazed in the first order and the optical fibers of the first set are used to recover the signals corresponding to the first order of diffraction.

This flat blazed grating is preferably used in a Littrow configuration.

The invention also relates to an optical add-drop multiplexer comprising:

a first optical component for separating the incident optical signals of different wavelengths with respect to one another, so as to extract one of these signals, and a second optical component for mixing the separated signals, except the one extracted, and for inserting in these mixed signals another optical signal having the same wavelength as the one extracted, this multiplexer being characterized in that the first optical component conforms to the optical component of the present invention.

BRIEF DESCRIPTION OF THE DRAWINGS

The present invention will be more readily understood upon reading the following description of embodiment examples, which is given merely for illustration purposes and is by no means limiting, with reference to the appended drawings in which.

DETAILED DESCRIPTION OF THE INVENTION

Figure 5:
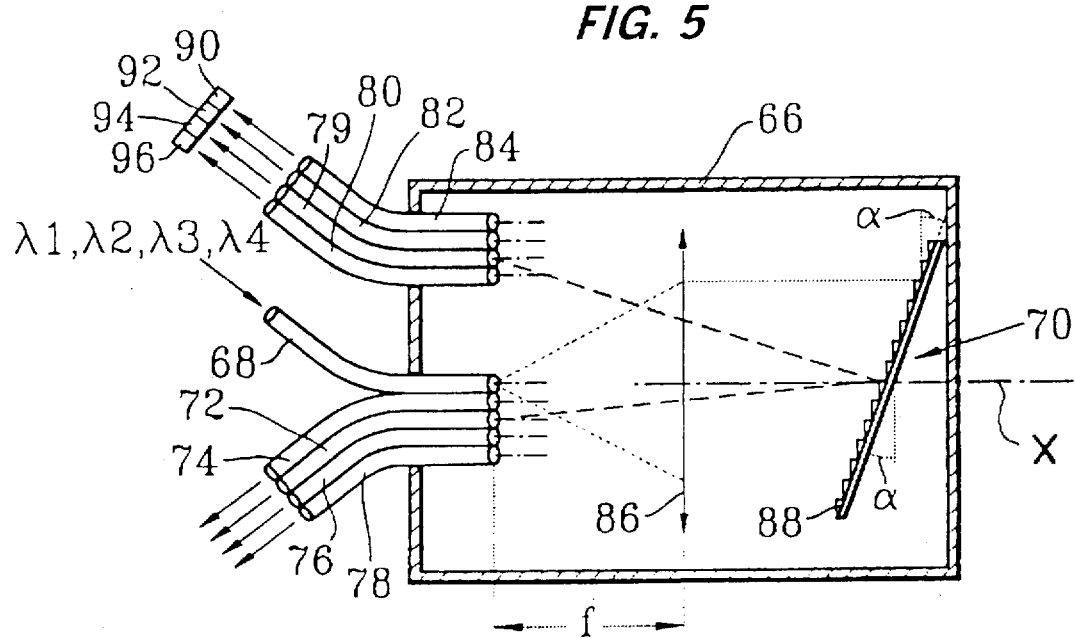
FIG. 5 is a diagrammatic sectional view of a particular embodiment of the optical component of the invention.

The optical component according to the invention, diagrammatically shown in FIG. 5, comprises, in a housing 66: an input optical fiber 68 in which N optical signals of different wavelengths $\lambda 1, \lambda 2, \ldots \lambda N$ propagate, N being equal to 4 in the example shown in FIG. 5, a diffraction grating 70 for angularly dispersing each of these signals on several orders of diffraction, and a set of N optical fibers, with reference numbers 72, 74, 76 and 78, intended to respectively recover the thus dispersed signals and corresponding to a given order of diffraction, so as to transmit these signals to other components not shown in FIG. 5.

In accordance with the present invention, the component of FIG. 5 further comprises, in the housing 66, another set of N optical fibers, referenced 79, 80, 82 and 84, used to respectively recover the same signals as those recovered by the fibers 72, 74, 76 and 78 but corresponding to another order of diffraction, so as to control the state of these recovered signals.

In the example shown in FIG. 5, the diffraction grating 70 is a flat grating.

In this case, the component further includes, in the housing 66, collimation optics 86 the optical axis of which bears the reference X on FIG. 5.

In another specific embodiment, instead of a flat diffraction grating, a concave diffraction grating could be used, which would not require any collimation optics.

With reference again to FIG. 5, respective ends of the fibers 68, 72, 74, 76 and 78 and 79, 80, 82 and 84 are located in the housing 66, and these ends are coplanar, and the axes of these ends are parallel to the axis X.

Furthermore, the corresponding end faces of the fibers are all located within a same focal plane of the optics 86 and are thus placed at the focal distance f thereof.

The end of the input optical fiber 68 located inside the housing 66 is situated on the axis X.

Each of the other ends placed in the housing 66 is suitably disposed in such a way as to receive the light for which it is intended.

Of course, the digital apertures in the fibers are selected in such a way so that each of these fibers receives the light for which it is intended and which corresponds to the diffraction in a specific order, via the grating 70, of the light output from the fiber 68.

In the example shown, the grating 70 is a flat blazed grating in the first order and used in a Littrow configuration.

Such choice makes it possible to obtain the smallest insertion losses for optical fiber transmission applications.

In this case, the grating 70, seen in section in FIG. 5, includes, like any diffraction grating, a set of parallel lines.

In the case of a blazed grating, these lines, seen in sectional view, have the shape of adjacent steps resting on the flat support 88 of the grating 70.

Each step forms a blaze angle $\alpha$ with this support 88 on which it rests.

Moreover, due to the choice of the Littrow configuration, the flat support 88 forms the blaze angle $\alpha$ with a plane perpendicular to the axis X, as can be seen on FIG. 5.

The fibers 72, 74, 76 and 78 or transmission fibers respectively receive the diffracted signals of wavelength $\lambda 1$ to $\lambda 4$ in the order 1.

In accordance with the invention, the other fibers or control fibers 79, 80, 82 and 84 are respectively provided to recover the diffracted signals of wavelength $\lambda 1$ to $\lambda 4$ in a higher order, order 2 for example.

The optical properties of a diffraction grating are disclosed in J. P. Laude, "Le Multiplexage en Longueur D'onde", previously mentioned, for example.

A grating with 150 lines per millimeter corresponds for example to optical demultiplexing applications at 1.5 µm.

Via the mathematical equations found in the Laude reference, a blaze angle $\alpha$ of 4.3° is obtained.

In these circumstances, the diffracted beams in the order 2 towards the control optical fibers form an angle of about 8.7° with optical axis X.

In fact, the parameters of the selected configuration (number of lines per millimeter, blaze angle, focal distance) depend on the selected characteristics for the optical component (distance between wavelength channels, passband of a channel).

Moreover, the equations disclosed in the Laude reference show that the angular dispersion is higher for the control fibers (diffraction at order 2) than for the transmission fibers 72 to 78.

Owing to this, if a wavelength moves away from its nominal value, the wavelength drift is faster at the level of the control fibers than at the level of the transmission fibers.

Figure 1:
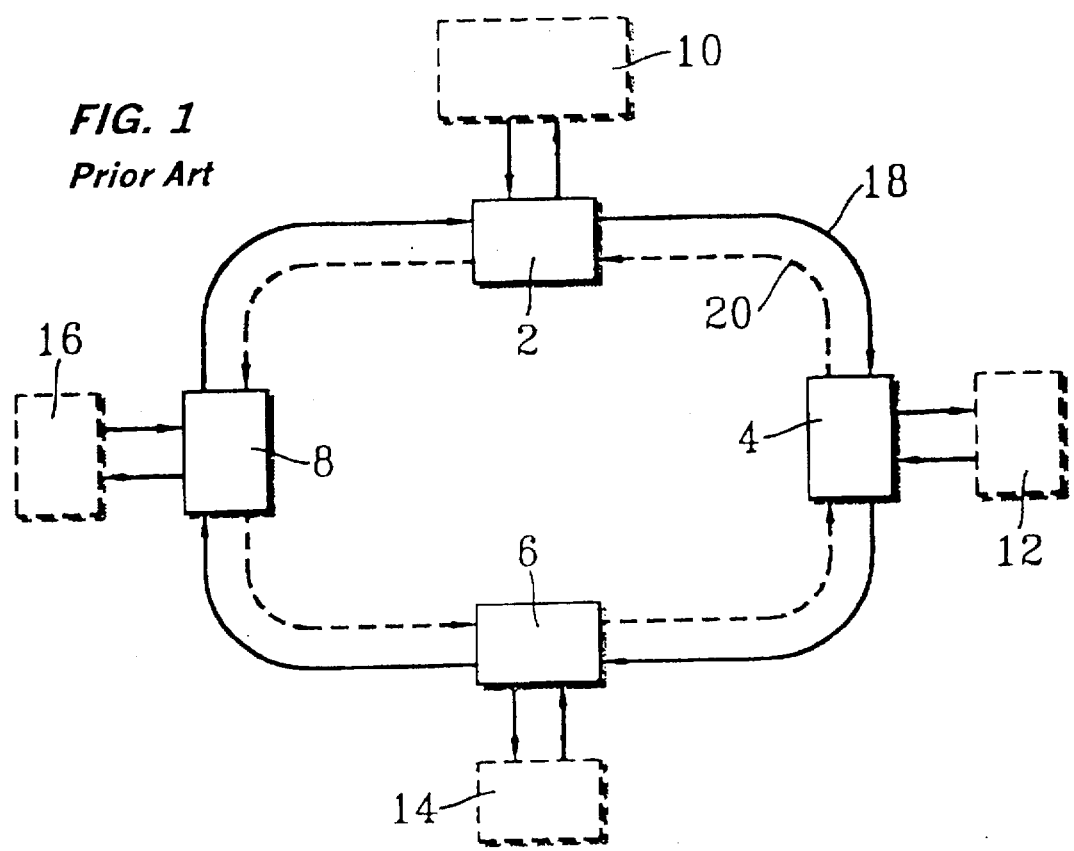
FIG. 1, already described, shows diagrammatically a unidirectional ring network using an electronic technique, FIG. 2, already described, shows diagrammatically a unidirectional ring network with spectral routing, FIG. 3, already described, shows diagrammatically an optical add-drop multiplexer with a diffraction grating, FIG. 4, already described, shows diagrammatically an optical add-drop multiplexer at the input of which a portion of the incident signals is extracted so as to analyze them.
Figure 3:
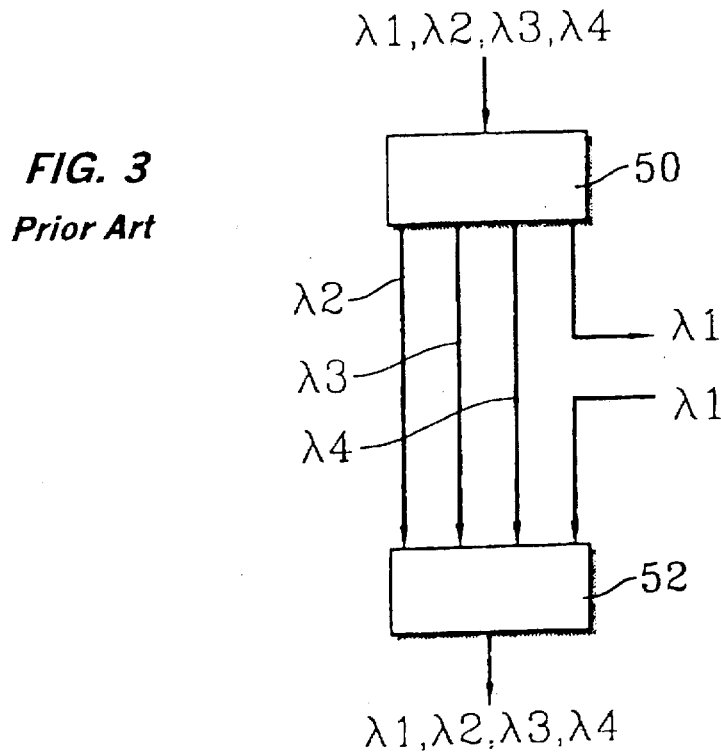
Figure 2:
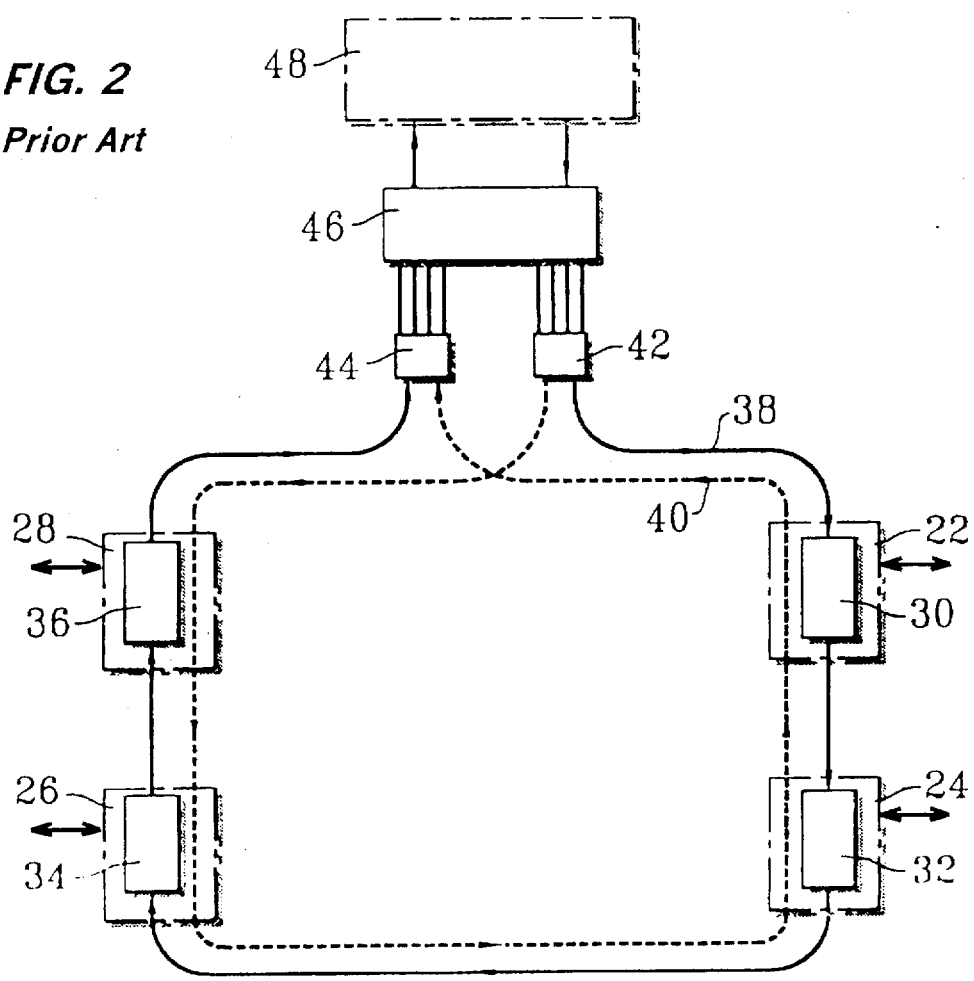
Figure 4:
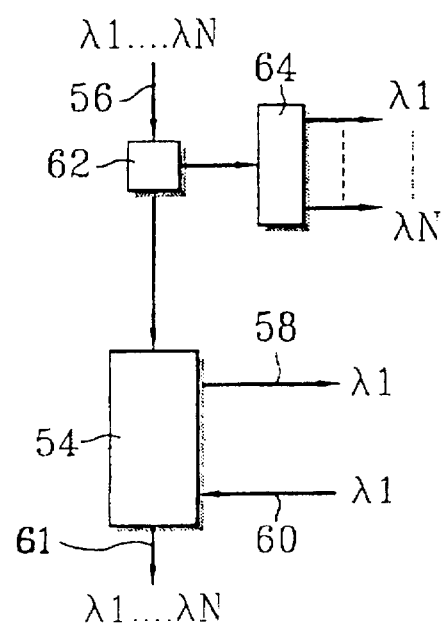

This property can be used in a ring network, for example of the type of FIG. 2, when optical add-drop multiplexers of the type of that of FIG. 5 are used in the nodes of this network, so as to evaluate a wavelength drift before this drifting results in an interrupted transmission.

In this case, photodetectors 90, 92, 94 and 96 are placed respectively opposite the other ends of the control fibers so as to ascertain the average power level coming out of these ends.

The minimum detection threshold of the signal is −34 dBm, in accordance with recommendation G957 of the International Telecommunication Union for an STM1 type transmission.

For a diffraction yield of 3% in order 2, the insertion losses of the control channel are about 15 dB.

The average power level detected on each link of the control channel is about −49 dBm at the level of the node or station 22 of the network of FIG. 2.

It is possible to compare this level with a threshold so as to draw up an alarm signal when the level becomes lower than this threshold.

This alarm signal is then transmitted to the network management means in the overflow of the link injected into each node of this network.

Figure 6:
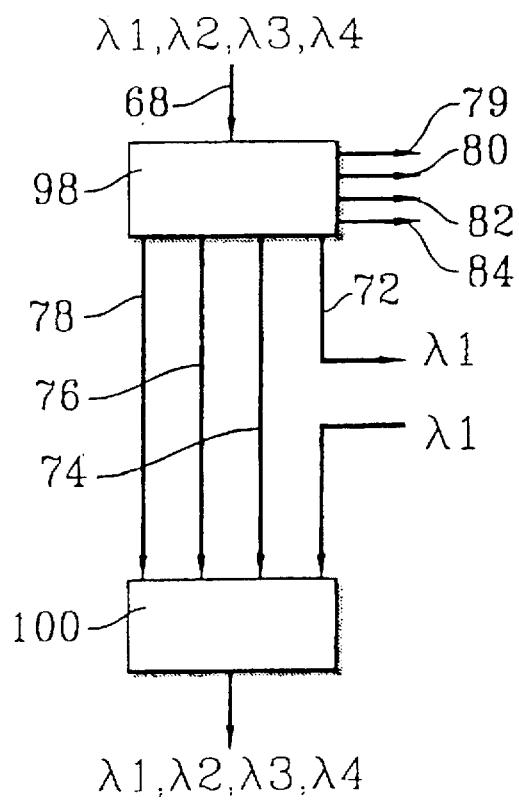
FIG. 6 is a diagrammatic view of an optical add-drop multiplexer using the component of FIG. 5.

FIG. 6 is a diagrammatic view of an optical add-drop multiplexer according to the invention and using the component of FIG. 5.

More specifically, the component described above with reference to FIG. 5 bears reference 98 on FIG. 6 and receives as its input (via the fibers 68) signals of respective wavelengths $\lambda 1, \lambda 2, \lambda 3$ and $\lambda 4$.

Via the optical fibers 79, 80, 82 and 84, this component 98 provides control signals of respective wavelengths $\lambda 1, \lambda 2, \lambda 3$ and $\lambda 4$.

In the example shown on FIG. 6, the wavelength $\lambda 1$ signal provided by the fiber 79 is extracted.

The other signals of wavelength $\lambda 2, \lambda 3$ and $\lambda 4$ are sent to the input of the optical coupling means 100 of the multiplexer of FIG. 6.

These optical coupling means 100 also receive at the input a signal of wavelength $\lambda 1$ constituting the signal to be inserted and the means 100 provide at the output a mix of signals of respective wavelengths $\lambda 1, \lambda 2, \lambda 3$ and $\lambda 4$.

Thus, a diffraction grating optical add-drop multiplexer is obtained allowing the wavelengths to be controlled at the input.

It is to be noted that the present invention allows for a control of the links at the level of the nodes of a ring network by means of the components which are already installed on this network, but which are modified by adding to each of them a set of fibers, which corresponds to an extremely small excess cost and does not result in any additional loss on the transmission link.

The documents mentioned in the present description are as follows:

We claim:

1. Optical component comprising:

an input optical fiber (68) for transmitting optical signals of different wavelengths with respect to one another, a diffraction grating (70) for angularly dispersing each of these signals on several orders of diffraction, and a first set of optical fibers (72, 74, 76, 78) for respectively recovering the dispersed signals having different wavelengths with respect to one another and corresponding to a given order of diffraction, so as to transmit these signals, this component being characterized in that it further includes a second set of optical fibers (79, 80, 82, 84) for respectively recovering the same signals as those recovered by the fibers of the first set but corresponding to another order of diffraction so as to control the state of these recovered signals.

2. Component according to claim 1, characterized in that the diffraction grating (70) is a flat blazed grating.

3. Component according to claim 2, characterized in that this flat grating (70) is blazed in the first order and in that the optical fibers (72, 74, 76, 78) of the first set are intended to recover the signals corresponding to the first diffraction order.

4. Component according to claim 3, characterized in that this flat blazed grating (70) is used in a Littrow configuration.

5. Optical add-drop multiplexer comprising:

a first optical component (98) for separating the incident optical signals with different wavelengths with respect to one another, so as to extract one of these signals, and a second optical component (100) for mixing the separated signals, except the one extracted, and inserting in these mixed signals another optical signal having the same wavelength as that of the one extracted, this multiplexer being characterized in that the first optical component (98) conforms to the optical component according to claim 1.

6. An optical ring network comprising:

a plurality of optical components according to claim 1;

each of the optical components connected to each other over an optical ring;

a plurality of network nodes; and each network node connected to one of said optical components so that the network nodes may communicate with each other over the optical ring.

7. A multiwavelength point-to-point link comprising:

a pair of optical components according to claim 1;

the optical components connected to each other over an optical fiber;

a pair of network nodes; and each network node connected to one of the optical components so that the network nodes may communicate with each other over the optical fiber.

\* \* \* \* \*

UNITED STATES PATENT AND TRADEMARK OFFICE
CERTIFICATE OF CORRECTION

PATENT NO. : 5,748,815
DATED : May 5, 1998
INVENTOR(S) : Andre Hamel et al.

It is certified that error appears in the above-identified patent and that said Letters Patent is hereby corrected as shown below:

Column 1, line 48, after "loop" insert --20--.

Column 8, please delete lines 1 and 2 in their entirety.

Signed and Sealed this

Twenty-first Day of July, 1998

Attest:

BRUCE LEHMAN

Attesting Officer

Commissioner of Patents and Trademarks